Dec. 23, 1969   M. E. GERARD   3,485,998
ADAPTOR TYPE ELECTRON BEAM WELDING APPARATUS
Filed June 29, 1967   2 Sheets-Sheet 1

INVENTOR.
M. E. GERARD
BY George E. Pearson
ATTORNEY

Dec. 23, 1969     M. E. GERARD     3,485,998

ADAPTOR TYPE ELECTRON BEAM WELDING APPARATUS

Filed June 29, 1967     2 Sheets-Sheet 2

INVENTOR.
M. E. GERARD
BY
George E. Pearson
ATTORNEY

United States Patent Office 3,485,998
Patented Dec. 23, 1969

3,485,998
ADAPTOR TYPE ELECTRON BEAM WELDING APPARATUS
Milan E. Gerard, Chula Vista, Calif., assignor to Rohr Corporation, Chula Vista, Calif., a corporation of California
Filed June 29, 1967, Ser. No. 650,069
Int. Cl. B23k 9/00
U.S. Cl. 219—121                                                    6 Claims

ABSTRACT OF THE DISCLOSURE

Adaptor and low vacuum backup chambers fit opposite sides of a contoured panel to enclose a butt joint region to be electron beam welded. A high vacuum chamber, too small to enclose the panel, mounts on the adaptor chamber and has a diffusion pump array and an electron beam gun operable along X, Y and Z axes from a sliding high voltage pickoff.

BACKGROUND OF THE INVENTION

This invention relates generally to electron beam welding and more particularly to improvements in electron beam welding apparatus and methods for forming butt welds in sheet metal workpieces, whether flat or contoured, which are too large to be contained within the high vacuum chamber required for performing the electron beam welding operation.

According to the method and arrangement of the present invention, a generally box shaped high vacuum chamber is provided within which the electron beam gun is mounted for traverse of the electron beam selectively along X–Y–Z axes so as to position and focus the beam relative to the butt joint to be welded and to move the beam along the joint in the welding operation. A peripheral array of small diameter diffusion pumps is mounted on the vacuum chamber, and these pumps, in turn, are connected through a flexible cable to a remotely situated roughing and backing pump. The vacuum chamber together with its electron beam gun, traverse mechanism, and diffusion pump array is thus portable and may be moved into poition relative to a sheet metal workpiece to enclose a region of the same to be welded. To this end, the bottom wall of the vacuum chamber is open for matching sealed engagement with the corresponding peripheral edge of a boxlike adaptor chamber which is open at the top to thus provide a continuation or extension of the high vacuum chamber in sealed engagement therewith, and is also open at the bottom for enclosing the surface of the workpiece in the region in which the weld is to be performed. For this purpose, the adaptor chamber has its lower peripheral edge contoured in accordance with the contour of the workpiece, and is thus flat when the workpiece is flat, or contoured, as required to interfit with the workpiece. This lower peripheral edge is provided with siutable seals to form a vacuum type engagement with the workpiece. A backup chamber similarly sealed and fitted to the opposite side of the workpiece in confronting relation to the peripheral edge of the adaptor chamber is suitably pumped to a lower order of vacuum.

Matched sets of backup and adaptor chambers are provided, for the various workpieces of different contour, each particular workpiece, of course, having a contour which differs from that of other contoured workpieces. The high vacuum chamber, however, which contains all of the working mechanisms of the adaptor chamber system in accordance with the adaptor chamber principle, is employed interchangeably with each of the matched sets of adaptor and backup chambers.

The high vacuum chamber is also provided with several ports for viewing the operation of the electron beam as it traverses along the butt joint to be welded, and the present invention further features the provision of a transparent expendable shield material which may be drawn progressively within the field of view of each port to provide a clear viewing section of the shield when the viewing area thereof becomes spattered with metal particles and vapors emitted from the welding region.

OBJECTS

Among the several objects and features of the present invention, the principal object is to provide a new and improved electron beam welding method and apparatus for forming butt welds in sheet metal.

Another object is to provide such butt welds in sheet metal workpieces, whether flat or contoured.

Another object is to provide a portable high vacuum chamber complete with electron beam gun, beam traverse mechanisms, and pumping system which may be used with different workpieces, whether flat or contoured.

Another object is to provide an adaptor chamber system in which the same high vacuum chamber required for operation of the electron beam gun may be used to weld different workpieces, whether flat or contoured.

Still another object is to provide a backup chamber which may be used as a matched set with an adaptor chamber for use with a particular contoured workpiece whose contour matches that of the confronting peripheral edges of the adaptor and backup chambers individual thereto.

Yet another object resides in the provision of means for protecting the viewing ports of the high vacuum chamber from obliteration by spattering of metal particles emitted from the welding zone.

Still other objects, features and advantages of the present invention will become more fully apparent as the description proceeds, reference being had to the accompanying drawings wherein:

BRIEF DESCRIPTION OF THE DRAWINGS

FIG. 3 is a fragmentary schematic view of the movement of the electron beam gun along the Z-axis;

THE SPECIFICATION

Figure 1:
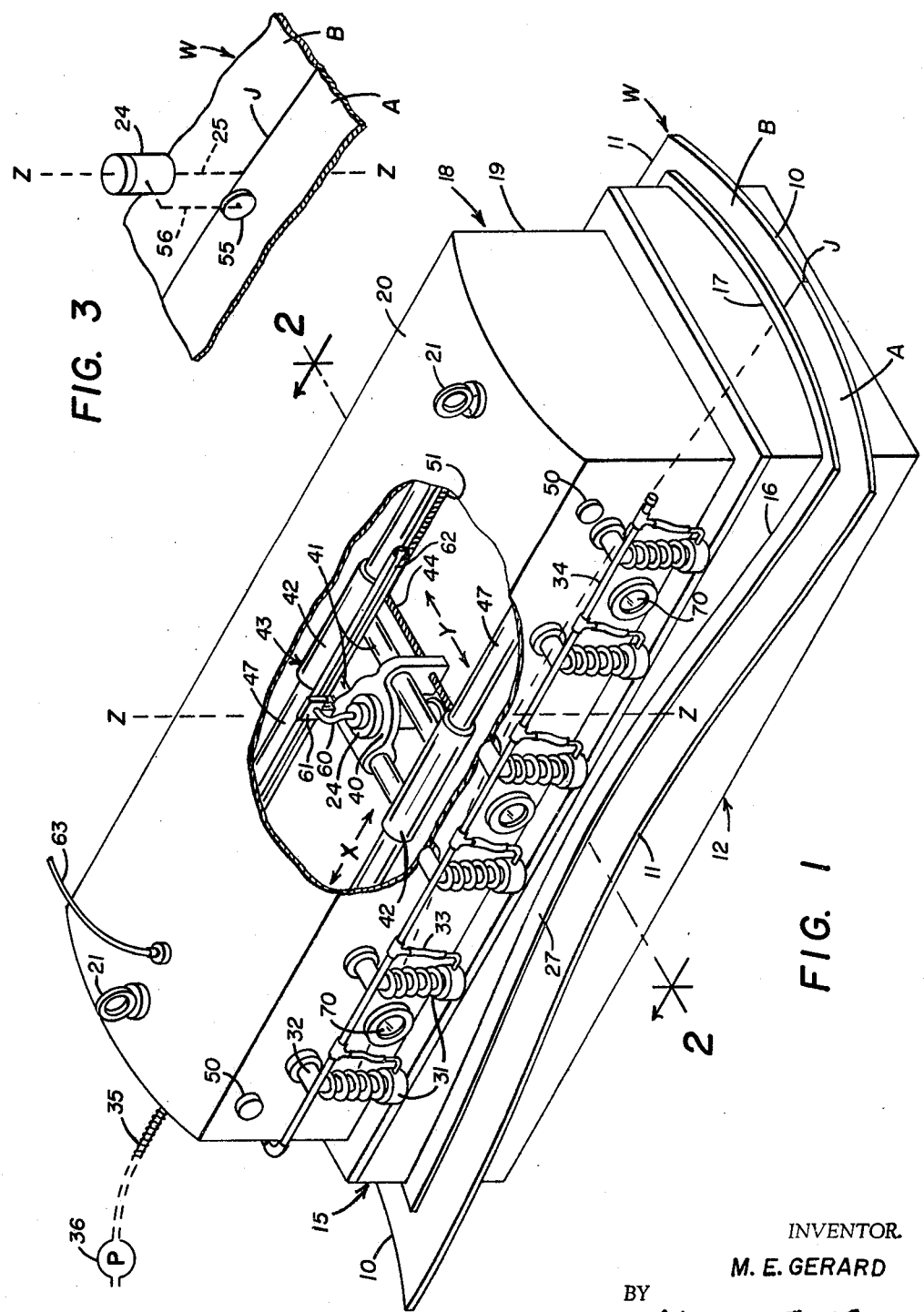
FIG. 1 is a perspective view of backup and adaptor chambers disposed in confronting relation to a compound contoured workpiece having a butt joint to be welded and further showing the high vacuum welding chamber in operative sealed engagement with the adaptor chamber, all in accordance with the adaptor chamber system of the present invention.
Figure 2:
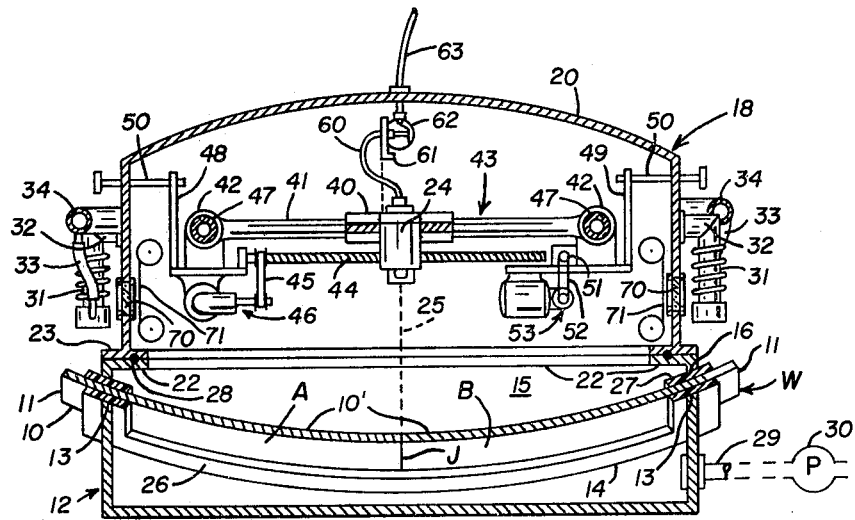
FIG. 2 is a vertical sectional view of the welding system of FIG. 1 as viewed along the lines 2—2 of FIG. 1.

Referring now to the drawings for a more complete understanding of the invention and first more particularly to FIGS. 1 and 2 thereof, there is shown thereon a double contoured workpiece W which comprises pieces A and B which are to be welded together along their common butt joint designated J. Pieces A and B together form a transversely concave upper surface as best depicted by the end faces or edges 10, FIG. 1, and by the cross sectional edges 10′, FIG. 2. The upper surfaces of pieces A and B are also longitudinally convex, as depicted by the side faces or edges 11 thereof which rise to a maximum midway between the end surfaces 10 of each piece. Workpiece W thus has a compound curvature and may, for example, be of a large size of the order of 68″ x 120″ and provide a butt joint J of the order of 70″ long.

Workpiece W rests upon a backup chamber unit which is generally designated 12 and is in the form of an elongated box-like chamber which is open at the top. The upper peripheral edge of chamber 12 follows the compound curvature of the workpiece and, to this end, the side edges 13 of chamber 12 are curved upwardly to match and interfit with the upwardly curved underside surfaces of the workpiece adjacent the peripheral edges 11 thereof. Similarly, the end edges 14 of backup chamber unit 12 are curved downwardly to match the downwardly curved underside surfaces of the workpiece adjacent the peripheral edges 10 of the workpiece.

An adaptor chamber unit generally designated 15 rests upon the upper surface of the workpiece W and is in the form of an elongated box-like frame open at both the top and bottom. Adaptor chamber 15 has the same peripheral shape as the backup chamber 12, and its lower peripheral edge which rests upon and matches the double contoured upper surface of workpiece W is disposed in confronting relation to the upper peripheral edge of the backup chamber 12. Thus, the side edges 16 of adaptor chamber 15 are curved upwardly to match the upwardly curved peripheral edges 11 of the workpiece W, and the downwardly curved end edges 17 of the adaptor chamber match the downwardly curved peripheral edges 10 of the workpiece.

A high vacuum electron beam welding chamber unit generally designated 18 rests upon the peripheral edge of adaptor chamber unit 15 and comprises a box-like chamber 19 of rectangular configuration. Chamber 19 has a curved upper surface 20 to which eyelets 21 are secured for receiving grappling hooks, or the like, so that the welding unit 18 may be moved by suitable mechanical lifting mechanism to position the unit on the adaptor chamber unit 15, as shown. Welding chamber unit 18 is open at the bottom, and its lower peripheral edge portion engages with and matches the upper peripheral edge of the adaptor chamber.

As best seen in FIG. 2, the adaptor chamber unit 15 has an inwardly extending upper peripheral flange 22 which matches the outwardly and inwardly extending peripheral flange 23 disposed at the lower peripheral edge portion of the welder chamber unit 18. The matching and engaging surfaces of the adjacently disposed flanges 22 and 23 are flat and uncontoured and, thus, the welding chamber unit 18 readily interfits interchangeably with any one of a number of adaptor chambers whose lower peripherally contoured edges match and interfit only with the contoured surface of the workpiece individual thereto. It will be understood, moreover, that for each such adaptor chamber individual to a particularly contoured workpiece, there will be a matching backup chamber 12 whose upper peripherally contoured edge or lip matches with the contoured underside of the workpiece. Thus, different matched sets of backup and adaptor chambers are required for a plurality of differently contoured workpieces, whereas the welding unit chamber 18 is made to interfit with each of the several adaptor chambers 15.

As disclosed in FIGS. 1 and 2, and as presently will be more fully described in detail, the welding chamber unit 18 comprises an electron beam gun 24 which produces an electron beam 25 for performing a welding function at the butt joint J of the workpiece W. Welding chamber unit 18 is thus an open ended power unit chamber having supported therewithin means for performing a work function on a workpiece which is too large to be inserted within the chamber 19 of the power unit. The adaptor chamber unit 15, which, as aforedescribed, is open at both ends, interfits with the open end of the power chamber unit in matched sealed engagement therewith, and the other open end of the adaptor chamber unit interfits in matched sealed engagement with the surface of the workpiece on one side thereof. The backup chamber 12, which together with the adaptor chamber unit 15 constitutes a matched set of chamber units individual to the particular workpiece W, is open ended and engages the opposite surface of its workpiece in matched sealed engagement therewith and in confronting relation to the workpiece-engaging peripheral edge of the adaptor chamber unit.

It will be apparent that the power chamber unit need not be limited to performing an electron beam welding functions such as disclosed in FIGS. 1 and 2, but may, for example, be an electric discharge chamber or pressure vessel such as disclosed in the copending application of Gilbert C. Cadwell for Electric Discharge Machine, Ser. No. 413,081, filed Nov. 23, 1964. As disclosed in that application, the peripheral edges of the pressure vessel and of an evacuated backup chamber are disposed on opposite sides of a sheet metal workpiece or blank which is retained in sealed engagement between the chambers. The pressure vessel or power chamber unit is filled with water, and capacitively stored electrical energy is dumped suddenly across a spark gap disposed within the water to thus cause explosive simulating shock waves to be set up within the water. These shock waves cause the blank to be forced into the evacuated backup chamber which in this case provides a die surface against which the metal blank is formed to thus produce the desired part. It will be apparent that this electric discharge method, when practiced in accordance with the principles of the present invention, may use the same electric discharge chamber unit, including its spark gap transducer and water supply system, interchangeably with matched sets of backup and adaptor chambers individual respectively to differently contoured workpieces in the same manner as hereindisclosed in the use of an electron beam welding system.

Any suitable seals are employed to provide a vacuum type sealed engagement of the backup and adaptor chambers with the lower and upper surfaces respectively of the workpiece W. For example, the rubberlike peripherally extending strips 26 and 27 of sheet rubber, or the like, are interposed respectively between the peripheral edge of backup chamber 12 and the lower surface of workpiece W and between the lower peripheral edge of adaptor chamber 15 and the upper surface of workpiece W. Seals 26 and 27 may advantageously be formed of a closed cell foam rubber gasket material to seal the backup and adaptor chambers effectively to the work surfaces of the workpiece W. The required vacuum type seal between the adaptor chamber and the high vacuum welding chamber 18, on the other hand, preferably is accomplished by use of the peripherally extending O-ring 28 which is disposed at the abutting and engaging surfaces of flanges 22 and 23 respectively of the adaptor and vacuum welding chambers 15 and 18.

Backup chamber 12 has an outlet port connected by a conduit 29 which leads to a suitable pump 30 for establishing a relatively low vacuum of the order of 100 microns pressure. The high vacuum chamber comprised of the adaptor and welding units 15 and 18 is pumped to a high vacuum suitable for welding, this high vacuum pressure being of the order of $5 \times 10^{-5}$ mm. Hg. Pumping to this high vacuum level preferably is accomplished in the use of a multiple array of small diameter diffusion pumps 31 which are disposed peripherally about the chamber 19 of the high vacuum unit 18. Each of these diffusion pumps is connected by an elbow 32 to a port therefor in chamber 19, and is further connected at its outlet by a conduit 33 to a peripherally extending manifold 34 which is common to the outlets of all the diffusion pumps 31. Manifold 34, in turn, is connected by a flexible conduit 35 which extends to a suitable roughing and backing pump 36. This pumping method and arrangement is substantially as disclosed and claimed in the copending application of Hugh M. Rush for Multiple Diffusion Pump Array for Improved Statistical Pumping of Vacuum Chamber, Ser. No. 631,494, filed Apr. 17, 1967, and reference may be had thereto for further details of construction and operation of the same.

Electron beam gun 24 is suitably mounted within the welding chamber unit 18 so as to move its electron beam 25 along X and Y axes and to move the gun itself along a Z axis to focus the beam relative to the butt joint J. The gun mounting mechanism, as herein disclosed for the purpose, is substantially the same as that disclosed somewhat in detail in the copending application of Milan E. Gerard for Apply Type E.B. Welding Apparatus, Ser. No. 605,852, filed Dec. 29, 1966, and reference may be had to this application for details of construction and operation of such a mounting mechanism. It will suffice herein therefore merely to point out that gun 24 is supported for movement axially along the Z—Z axis upon a crossfeed support 40 which moves slidably upon the spaced rods 41 and along the Y—Y axis, these rods in turn being secured to the spaced tubes 42. Spaced rods 41 and spaced tubes 42 together constitute a carriage which is generally designated 43. Crossfeed 40 is driven by a feedscrew 44 which has a belt drive connection 45, FIG. 2, with a motor driven gear train generally designated 46 which is carried by the carriage 43.

Tubes 42 of carriage 43 move slidably upon the spaced tubes 47 to thus provide for movement of the carriage along the X—X axis. Tubes 47 are supported at the ends thereof by a framework including the side frame members 48 and 49 depicted in FIG. 2. Frame members 48 and 49 have screw supports 50 which are adjustable from outside the chamber 19 to provide a precision adjustment of the entire gun support mechanism to set the beam 25 on the joint J and to assure that when the carriage is moved along the X axis that the beam 25 will follow along the joint.

A feedscrew 51 which parallels the carriage support tubes 47 engages the carriage operatively to move the same along the X axis, the feedscrew having a belt driving connection 52 with a motor driven gear train generally designated 53 which is supported on the side frame member 49, FIG. 2.

It will be understood that the electron beam gun 24, in actual practice, may have gimbal and other supports on the crossfeed 40 for aligning the beam 25 relative to the Z axis, or for adjusting the gun along the Z axis. It will be understood, moreover, that a suitable means is provided for adjusting gun 24 along the Z axis so as to maintain the beam 25 in focus at the joint J as the joint rises and falls to and from a point midway between the ends 10 of the workpiece W in response to traverse of the gun 24 along the X axis to thus traverse the beam along the butt joint J. A suitable means for this purpose is disclosed schematically in FIG. 3 wherein a small wheel 55 operatively connected as indicated by the dashed line 56 with the gun 24 follows the contour of the workpiece as the same moves along the butt joint J and thus causes the gun to rise and fall with the contour.

Gun 24 has a cable 60 for supplying the filament and beam power thereto, cable 60 being connected with a slide or shoe 61. Slide 61 is operatively connected to carriage 43 and is moved therewith as the same is moved along the X axis. Slide 61 makes an electrical connection with a bus bar assembly 62 which is mounted parallel with the carriage support tubes 47 and is electrically connected to the power inlet cable 63 for supplying the beam and filament power to the welding chamber unit 18. Gun cable 60 has sufficient length and flexibility to permit traverse of the crossfeed 40 transversely upon the carriage 43 and along the Y axis without requiring a high voltage sliding contact such as provided for operation along the X axis in view of the fact that the chambers 12, 15 and 18 are first roughly located relative to the butt joint J and, thereafter, it becomes necessary only to move the crossfeed 40 a relatively small distance to bring the beam 25 into substantial alignment with the joint J. After this is accomplished, the precision alignment may be effected, as required, by suitable adjustment of one or more of the aforedescribed screws 50. The sliding contact and bus bar arrangement is substantially as disclosed in the copending application of Milan E. Gerard for High Voltage Power Pickoff for a Moving E.B. Gun, Ser. No. 597,752, filed Nov. 29, 1966, now Patent Number 3,382,328, and reference may be had to this application for further details regarding construction and operation.

Figure 5:
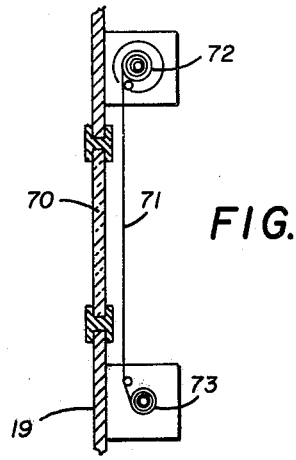
FIG. 5 is an enlarged fragmentary sectional view showing the protective means for one of the viewing ports shown in FIG. 2.

A plurality of viewing ports 70 are provided about the periphery of welding chamber unit 18 to afford a view of the welding operation taking place along the butt joint J as the welding of the joint progresses upon traverse of the gun along the X axis. The view from each port is protected against obliteration resulting from impingement thereon of metal particles and vapors emitted from the welding zone. This is accomplished by placing a shield of transparent plastic material such as "Saran Wrap" adjacent to the inner face of the window 70, the shield, preferably as best seen in FIG. 5, being in the form of an elongated strip 71 of such material supplied in a shielded roll 72 and drawn past the window to a take up reel 73. The strip 71 may be moved across the window by any suitable means (not shown) whether manual or by a suitable motor drive. The impingement of the view obstructing metal particles and vapors is thus deposited on the shield 71 which may be removed manually or by the motor drive to bring up a new, clear section of the shield when a view of the welding operation is desired through its associated window.

Figure 4:
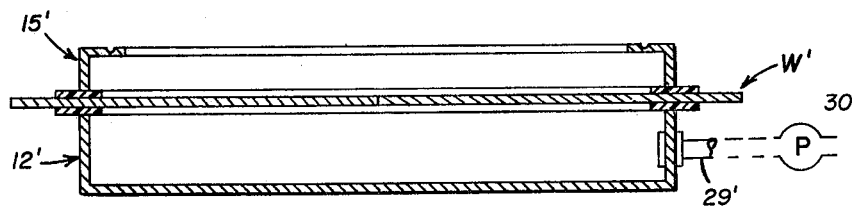
FIG. 4 is a vertical sectional view showing a matched set of backing and adaptor chambers disposed in confronting relation with a flat workpiece.

With reference to FIG. 4, it may be seen that there is disclosed a matched set of backup and adaptor chamber units 12' and 15', respectively, which are formed as regards their confronting peripheral edges in an obvious manner to interfit, respectively, with the opposite faces of the flat workpiece W', the chamber units otherwise being identical to chamber units 12 and 15 disclosed in FIGS. 1 and 2.

From the foregoing, it should now be apparent that there has been provided in fulfillment of the aforestated objects of the invention, a method and apparatus which is well adapted to perform electron beam welding of large structures through use of portable chambers. As stated broadly in summary, the adaptor chamber method and arrangement of the hereindisclosed invention for performing a work function on workpieces of different contour comprises the steps of releasably sealing opposite side surface portions of the workpiece with matched and confronting backup and adaptor chambers, and releasably sealing the adaptor chamber with a power chamber useable with various matched sets of backup and adaptor chambers and having means for performing the work function on the workpiece. The method, as applied to an electron beam welding operation, further contemplates the steps of respectively developing relatively high and low vacuum pressure in the power and backup chambers, and further contemplates operation of an electron beam gun including X, Y adn Z axis traverses thereof within the combined space afforded by the power and adaptor chambers and evacuated to the high vacuum pressure by a peripheral array of small diffusion pumps. While only a few examples of the invention have been disclosed, it will be apparent that the same may be embodied in other forms or carried out in other ways without departing from the spirit or essential characteristics thereof. The present embodiment of the invention is therefore to be considered in all respects as illustrative and not restrictive, the scope of the invention being indicated by the appended claims, and all changes coming within the meaning and range

Having thus described the invention, what is claimed as new and useful and desired to be secured by Letters Patent is:

1. Adaptor type electron beam welding apparatus for electron beam welding a portion of the length of a butt joint in a contoured panel comprising, in combination, an adaptor chamber open at both ends and having one open end thereof contoured in matching relation to the contour of the panel and disposed in vacuum sealed relation against one side surface of the panel to enclose within the adaptor chamber said length portion of the butt joint, an open ended backup chamber having the open end thereof contoured in matching relation to the contour of the panel and disposed in vacuum sealed relation against the opposite side surface of the panel to enclose within the backup chamber said length portion of the butt joint, an open ended high vacuum chamber too small to enclose said panel therewithin and having the open end thereof disposed in matched vacuum sealed engagement with the other open end of the adaptor chamber, an electron beam gun disposed within said high vacuum chamber with its beam directed along a Z axis through the high vacuum and adaptor chambers to said one side surface of the panel, X axis gun support means mounted on the high vacuum chamber for moving the gun therewithin along an X axis extending parallel to said butt point to move the beam therealong when aligned therewith, Y axis gun support means mounted on said X axis gun support means for moving the gun along a Y axis extending transversely of said butt joint thereby to align the beam therewith, Z axis gun support means mounted on said Y axis gun support means for moving the gun along the Z axis to follow said contour in the panel thereby to bring the beam into focus on the butt joint as the beam moves therealong, and means connected to said high vacuum chamber for drawing a high vacuum within said vacuum sealed high vacuum and adaptor chambers.

2. Apparatus as in claim 1, said high vacuum drawing means comprising a plurality of small diffusion pumps mounted in peripherally spaced relation about said high vacuum chamber and having their respective inlets connected thereto, a manifold having the respective outlets of said diffusion pumps connected thereto to provide a common outlet therefor, a roughing and backing pump, and a flexible conduit interconnecting said manifold and said roughing and backing pump.

3. Apparatus as in claim 1 wherein the backup chamber unit is a vacuum chamber connectable to means for drawing a vacuum therein to a lesser order of vacuum than in said high vacuum chamber.

4. Apparatus as in claim 1, said high vacuum chamber having a high voltage sliding pickoff for supplying filament and beam power to the electron beam gun as the same moves along said one of said X axis and having drive means for moving the electron beam gun and pickoff along said X axis.

5. Apparatus as in claim 1, said high vacuum chamber having at least one window for viewing the welding operation effected by the beam as the same traverses along the butt joint.

6. Apparatus as in claim 5, said high vacuum chamber having a length of transparent shield disposed therewithin in masking relation to said window and means for moving the shield progressively past the window to remove sections thereof having objectionable deposition of metallic vapor thereon thereby to provide a clear view of the welding operation through the window and shield.

References Cited

UNITED STATES PATENTS

| | | | |
|---|---|---|---|
| 2,746,420 | 5/1956 | Steigerwald | 219—121 |
| 3,101,169 | 8/1963 | Smith | 230—44 |
| 3,112,391 | 11/1963 | Sciaky | 219—121 |
| 3,136,883 | 6/1964 | Radtke | 219—121 |
| 3,154,138 | 10/1964 | Orr | 230—101 |
| 3,156,810 | 11/1964 | Samuelson | 219—121 |
| 3,219,792 | 11/1965 | Pederson | 219 —121 |
| 3,264,004 | 8/1966 | Sciaky | 219—121 |
| 3,301,993 | 1/1967 | Boyd et al. | 219—121 |
| 3,369,101 | 2/1968 | Di Curcio | 219—121 |
| 3,383,492 | 5/1968 | Solomon | 219—121 |
| 3,300,618 | 1/1967 | Sciaky | 219—121 |
| 3,401,249 | 9/1968 | Schleich et al. | 219—121 |
| 3,426,173 | 2/1969 | Steigerwald | 219—121 |
| 3,427,429 | 2/1969 | Leke | 219—126 |
| 3,382,328 | 5/1968 | Gerard | 191—12 |

FOREIGN PATENTS 634,718 11/1963 Belgium.

JOSEPH V. TRUHE, Primary Examiner

W. D. BROOKS, Assistant Examiner

U.S. Cl. X.R.

219—69, 72